(12) United States Patent
Bianco et al.

(10) Patent No.: US 6,878,349 B2
(45) Date of Patent: Apr. 12, 2005

(54) POLLUTION CONTROL DEVICE

(76) Inventors: Edward Domenic Bianco, 258 Saint David Dr., Mt. Laurel, NJ (US) 08054; Michael A. Kline, 1725 Gibson Rd., Bensalem, PA (US) 19020

(*) Notice: Subject to any disclaimer, the term of this patent is extended or adjusted under 35 U.S.C. 154(b) by 490 days.

(21) Appl. No.: 10/165,463

(22) Filed: Jun. 7, 2002

(65) Prior Publication Data

US 2002/0155042 A1 Oct. 24, 2002

Related U.S. Application Data

(62) Division of application No. 09/694,622, filed on Oct. 23, 2000, now Pat. No. 6,432,280.

(51) Int. Cl.[7] ............................................. B01J 19/08
(52) U.S. Cl. ................................................ 422/186.04
(58) Field of Search ..................................... 422/186.04

(56) References Cited

U.S. PATENT DOCUMENTS

| | | | |
|---|---|---|---|
| 2,382,253 A | 8/1945 | Penney et al. ................. 183/7 |
| 2,962,265 A | 11/1960 | Van Luik, Jr. ................ 257/43 |
| 3,444,061 A | 5/1969 | Hellund ...................... 204/164 |
| 3,674,666 A | 7/1972 | Foster et al. ................ 204/164 |
| 3,706,182 A | 12/1972 | Sargent ....................... 55/124 |
| 3,739,554 A | 6/1973 | Whetten et al. ............... 55/123 |
| 3,745,751 A | 7/1973 | Zey et al. ..................... 55/122 |
| 3,844,741 A | 10/1974 | Dimitrik ....................... 55/102 |
| 3,846,637 A | 11/1974 | Gettinger .................... 250/546 |
| 3,856,476 A | 12/1974 | De Seversky ................. 23/284 |
| 3,869,362 | 3/1975 | Machi et al. ......... 204/157.1 R |
| 3,869,362 A | 3/1975 | Machi et al. ......... 204/157.1 R |
| 3,907,520 A | 9/1975 | Huang et al. .................... 55/4 |
| 3,981,815 A | 9/1976 | Taniguchi et al. .......... 252/182 |
| 4,077,888 A | 3/1978 | Rhoades et al. ............ 250/543 |
| 4,077,889 A | 3/1978 | Rhoades et al. ............ 250/543 |
| 4,175,016 A | 11/1979 | Lewis et al. ............. 204/157.1 |

(Continued)

OTHER PUBLICATIONS

Jun. 26, 2000 Seminar, "Advanced Oxidation Technologies Fundamental and Environmental Applications", Science & Technology Integration, Inc., pp. 29–43.

Urabe, T., et al. "Experimental Studies on Mercury Vapor Removal by Corona Discharge . . . ", Chemical Abs., vol. 109, #236097, Oct. 1987.

Dhali, S.K., et al. "Dielectric–barrier Discharge for Processing of $SO_2/NOx$", Journ. App. Physics, vol. 69, pp. 6319–6234, May 1991.

McLarnon, Christopher R., Nitrogen Oxide Decomposition by Barrier Discharge, Dissertation for Doctor of Philoscophy Degress in Chemical Engineering, University of New Hampshire, May 1996.

(Continued)

*Primary Examiner*—Kishor Mayekar
(74) *Attorney, Agent, or Firm*—Duane Morris LLP

(57) ABSTRACT

A pollution control apparatus and method reduces contaminants, such as $NO_x$ and $SO_x$ pollutants, from an effluent gas stream. The pollution control device includes a resonance chamber that ionizes the effluent gas stream. The contaminants of the effluent gas stream are destroyed in a non-thermal plasma reactor. The effluent gas is then cooled in a cooling unit to substantially place the effluent gas in a non-excited state prior to releasing the effluent gas into the environment or re-injecting the effluent gas into the source of the effluent gas. Re-association of the radical oxides into harmful pollutants is thereby substantially prevented.

28 Claims, 4 Drawing Sheets

U.S. PATENT DOCUMENTS

| | | | |
|---|---|---|---|
| 4,181,704 A | 1/1980 | Sheer et al. | 423/230 |
| 4,319,891 A | 3/1982 | Anderson et al. | 55/15 |
| 4,351,810 A | 9/1982 | Martinez et al. | 423/235 |
| 4,367,130 A | 1/1983 | Lemelson | 204/157.1 S |
| 4,376,637 A | 3/1983 | Yang | 55/2 |
| 4,378,976 A | 4/1983 | Rush | 55/15 |
| 4,474,621 A | 10/1984 | Saccocio et al. | 134/1 |
| 4,540,554 A | 9/1985 | Dayen | 423/235 |
| 4,582,004 A | 4/1986 | Fey et al. | 110/346 |
| 4,644,877 A | 2/1987 | Barton et al. | 110/250 |
| 4,650,555 A | 3/1987 | Rzad et al. | 204/174 |
| 4,657,738 A | 4/1987 | Kanter et al. | 422/186.04 |
| 4,695,448 A | 9/1987 | Anthony | 423/659 |
| 4,885,139 A | 12/1989 | Sparks et al. | 422/169 |
| 4,925,639 A | 5/1990 | Stauffer | 423/235 |
| 4,933,060 A | 6/1990 | Prohaska et al. | 204/192.36 |
| 5,087,428 A | 2/1992 | Fletcher et al. | 422/186.07 |
| 5,134,946 A | 8/1992 | Poovey | 110/346 |
| 5,137,546 A | 8/1992 | Steinbacher et al. | 55/10 |
| 5,147,516 A | 9/1992 | Mathur et al. | 204/177 |
| 5,198,201 A | 3/1993 | Johnson | 423/235 |
| 5,284,556 A | 2/1994 | Rich | 204/164 |
| 5,324,492 A | 6/1994 | Masuda et al. | 423/235 |
| 5,366,701 A | 11/1994 | Taylor et al. | 422/186.04 |
| 5,458,748 A | 10/1995 | Breault et al. | 204/177 |
| 5,512,144 A | 4/1996 | Stauffer | 205/554 |
| 5,601,791 A | 2/1997 | Plaks et al. | 422/169 |
| 5,695,616 A | 12/1997 | Helfritch et al. | 204/157.3 |
| 5,711,147 A | 1/1998 | Vogtlin et al. | 60/274 |
| 5,733,360 A | 3/1998 | Feldman et al. | 95/78 |
| 5,746,984 A | 5/1998 | Hoard | 422/169 |
| 5,753,087 A | 5/1998 | Wang et al. | 204/164 |
| 5,807,466 A | 9/1998 | Wang et al. | 204/177 |
| 5,836,154 A | 11/1998 | Williamson et al. | 60/275 |
| 5,843,288 A | 12/1998 | Yamamoto | 204/164 |
| 5,855,855 A | 1/1999 | Williamson et al. | 422/186.04 |
| 5,871,703 A | 2/1999 | Alix et al. | 423/210 |
| 5,872,426 A | 2/1999 | Kunhardt et al. | 313/582 |
| 5,904,905 A | 5/1999 | Dolezal et al. | 422/186.04 |
| 5,906,715 A | 5/1999 | Williamson et al. | 204/164 |
| 6,007,682 A | 12/1999 | Hancock et al. | 204/164 |
| 6,030,506 A | 2/2000 | Bittenson et al. | 204/164 |
| 6,038,853 A | 3/2000 | Penetrante et al. | 60/274 |
| 6,132,692 A | 10/2000 | Alix et al. | 423/210 |
| 6,136,158 A | 10/2000 | Wang et al. | 204/177 |
| 6,139,694 A | 10/2000 | Rogers et al. | 204/177 |
| 6,146,599 A | 11/2000 | Ruan et al. | 422/186.04 |
| 6,190,507 B1 | 2/2001 | Whealton et al. | 204/157.3 |
| 6,264,899 B1 | 7/2001 | Caren et al. | 422/186.3 |

OTHER PUBLICATIONS

Penetrante, Bernie M., Effect of Electrical Parameters on the Chemical Kinetics of Plasma–Based Air Pollution Control, Applications of Electrostatics for Control of Gas Phase Air Pollutants Workshop, Cincinnati, Ohio, Aug. 22, 1997.

Helfritch, Dennis J., Plasma Based Technologies Applied to Air Pollution Control, Applications of Electrostatics for Gas Phase Air Pollutants Workshop, Cincinnati, Ohiom Aug. 22, 1997.

Monroe, Larry S., et al., Testing of a Combined Dry and Wet Electrostatic Precipitator for Control of Fine Particulate Emissions from a Coal–Fired Boiler, EPRI–DOE–EPA Combined Utility Air Pollutant Control Symposium, Washington, DC, Aug. 25–29, 1997.

Chemetics International Ltd., Acid Recovery and Concentration Brochure, date unknown, Vancouver, Canada.

POLLUTION CONTROL DEVICE

CROSS REFERENCE TO RELATED APPLICATIONS

This application is a divisional application of U.S. patent application Ser. No. 09/694,622 now U.S. Pat. No. 6,432,280 of Edward Domenic Bianco and Michael A. Kline, filed Oct. 23, 2000, entitled "Pollution Control Device."

FIELD OF THE INVENTION

The present invention relates to pollution control apparatuses and methods for reducing contaminants in an effluent gas flow, and more particularly to pollution control devices utilizing non-thermal plasma reactors.

DESCRIPTION OF THE RELATED ART

Today's industrial processes create enormous amounts of pollutants. Many of these sources release gasses containing these pollutants into the environment. Examples of these sources include factories, combustion engines, dump sites, land fills, sewage treatment plants and lagoons and waste heaps, to name a few. The primary air pollutants in these gases include NO, $NO_2$, $SO_2$, $CO_2$, and hydrocarbons.

Several devices and methods for removing pollutants from these gasses have developed. These devices utilize mechanical, electrical, electro-chemical, and chemical processes. Typical examples include filters, aqueous scrubbers, electrostatic precipitators, and catalytic converters.

Some existing electrical and electrochemical pollution control devices and methods operate on the theory that through dissociation, toxic and hazardous oxides can be separated from an effluent gas through ionization and non-thermal plasma fields. One such pollution control device is described in U.S. Pat. No. 5,366,701 issued to Taylor et al. on Nov. 22, 1994, the entirety of which is hereby incorporated by reference.

Taylor describes an apparatus where an effluent gas is ionized in a resonance field and then passed through a continuous electric arc to potentialize the gas. The treated effluent gas is then released into the environment at temperatures ranging from 100° F. to 250° F. where ultraviolet light and the solar spectrum ideally energize the gas into inert non-toxic gases. Unfortunately, processes such as the one disclosed in Taylor do not complete the processing of dissociated contaminants, such as dissociated oxides. Although the temperature of the released effluent gas is lower than the temperature of the effluent gas entering the apparatus, the release temperature of the gas is still elevated. Therefore, the gas is still in an excited state and re-association of excited radical oxides is prevalent, for example, thereby allowing the formation of harmful pollutants that include aerosol chains that lead to greenhouse gasses and acid rain.

Still further, some pollution control devices utilize non-thermal plasma reactors that expose an electrode, such as a corona wire, to the contaminants in the effluent gas to be treated. Contaminants accumulate on the electrode and reduce the efficiency of the device. The electrode eventually must be replaced.

Therefore, there remains a need to process effluent gasses in a manner that substantially reduces the re-association of dissociated components of an effluent gas into harmful pollutants, particularly as environmental regulations become increasingly more stringent. Also, there remains a need for a pollution control device which allows for recapture of commercially valuable products. Further, there remains a need for a new non-thermal plasma reactor that efficiently processes contaminants in an effluent gas without exposing the electrode to harmful contaminants.

SUMMARY OF THE INVENTION

A pollution control device for reducing contaminants in an effluent gas includes a resonance chamber in gaseous communication with a source of the effluent gas. The resonance chamber ionizes the effluent gas. An output non-thermal plasma reactor is in gaseous communication with an output of the resonance chamber and destroys at least a portion of the contaminants in the effluent gas. The pollution control device also includes an output cooling unit in gaseous communication with an output of the output non-thermal plasma reactor. The output cooling unit is adapted to cool the effluent gas to a non-excited state, whereby re-association of oxides in the effluent gas is substantially reduced.

The pollution control device provides several benefits over existing pollution control devices. For example, the processed effluent gas is placed in a steady state prior to either release into the environment or re-injection into the source of the effluent gas. It is believed that the steady state effluent gas tends to associate into near perfect molecules rather than re-associate into harmful pollutants, thereby preventing the formation of harmful pollutants that include aerosol chains that lead to greenhouse gasses and acid rain. Also, the cooling of the effluent gas may cause the effluent gas to reach several dew points within the pollution control device. These dew points allow for the recovery of commercially significant compounds, such as sulfates, sulfites, nitrates, and nitrites.

The above and other features of the present invention will be better understood from the following detailed description of the preferred embodiments of the invention that is provided in connection with the accompanying drawings.

BRIEF DESCRIPTION OF THE DRAWINGS

In the drawings, the arrows indicate the general direction of effluent gas flow. Like components have been designated with like numerals throughout.

DETAILED DESCRIPTION OF THE INVENTION

Figure 1:
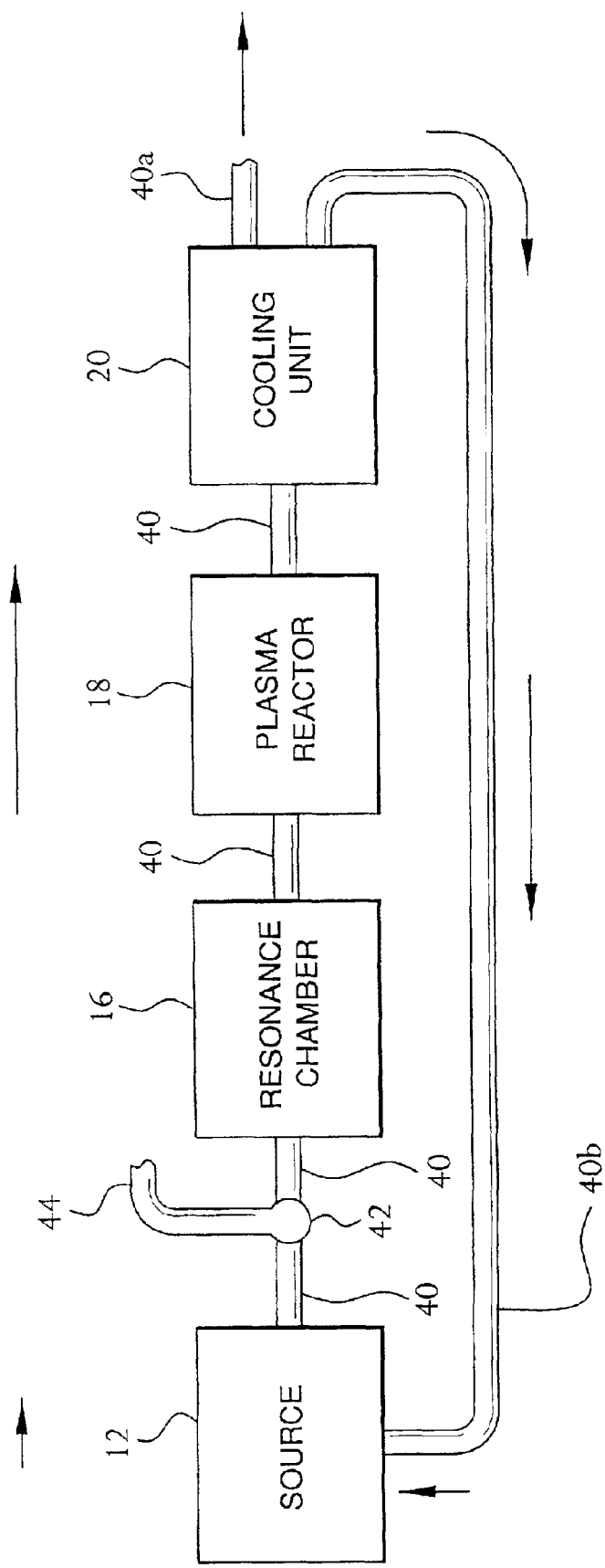
FIG. 1 is a block diagram of an exemplary pollution control device according to the present invention.

FIG. 1 is a block diagram of an exemplary pollution control device according to the present invention. The directional arrows of FIG. 1 illustrate the flow of an effluent gas through the pollution control device. A source 12 of an effluent gas that includes contaminants is coupled to an input of a resonance chamber 16. The source of the effluent gas may be a diesel combustion source, a coal power generation plant, a mechanical waste incinerator, a trash-to-steam plant, a landfill, lagoon or other source of gasses that contain particulate emissions, heavy metals such a mercury, nitrous oxides ($NO_x$), sulfur oxides ($SO_x$), carbon monoxide (CO), carbon dioxide ($CO_2$), and volatile organic compounds (VOCs).

The effluent gas passes from source 12 through a piping system 40 to the resonance chamber 16. The piping system preferably includes Polyvinyl Chloride (PVC) pipe. It is believed that PVC piping provides the added feature of sulfur exchange with the effluent gas. The piping system 40 preferably includes an inlet port 42 which allows the effluent gas to pass without significant resistance to the resonance chamber 16. The inlet port 42 preferably utilizes electronic valves actuated by logic circuitry, such as a programmable logic controller (PLC), to allow bypassing of portions of the effluent gas to other pollution control devices, such as the pollution control device described herein, that are operated in parallel for processing larger quantities of effluent gases.

Within the resonance chamber 16, the effluent gas is ionized by the established resonance field before flowing to the output non-thermal plasma reactor 18 discussed below. The output non-thermal plasma reactor 18 operates more efficiently on an ionized effluent mass. The resonance chamber 16 may also be configured to dissociate some of the oxide contaminants of the effluent gas and/or to collect and "knock down" heavy oxides, hydrocarbons, ash, and dust. The effluent gas mass passes through plate and wire electrostatic precipitators within the resonance chamber 16 powered by an AC or DC power source. Suitable electrostatic precipitators are manufactured and available from several companies. For instance, the Joy Manufacturing/Western Precipitation Co. and Beltran Associates Inc. of New York manufacture electrostatic precipitators for large scale industrial applications, and Honeywell manufactures electrostatic precipitators for smaller scale applications.

As mentioned above, the power source of the resonance chamber 16 may be an AC or a DC power supply. The power source is preferably pulsed on a three phase system for canceling grounds, thereby allowing the electrostatic precipitators to run wet or dry without sparking or arcing. A PLC is preferably used to control the power source to produce an appropriate power output to match the density of the effluent gas. The resonance chamber may be powered either by an AC or DC pulsed power supply to collect oxides, ash, hydrocarbons and dust. Also, an AC or DC pulsed supply may be used to generate plasma streamers that dissociate contaminants within the effluent gas. High powered, high frequency sources may be used to target heavy metals and VOCs, whereas lower power, lower frequency sources may be used to target $NO_x$ and $SO_x$ contaminants. Both collection and dissociation may be accomplished if multi-chambered resonance chambers are employed or a plurality of resonance chambers are included within a pollution control device.

In any case, the power requirements and frequency setting for the resonance chamber will vary depending upon the effluent gas source and type of effluent gas being treated. Preferably, the voltage may vary between 10,000 to 100,000 volts at 65 to 900 milliamperes, and the frequency of an AC power source may vary between 60 to 20,000 Hertz.

An output non-thermal plasma reactor 18 is in gaseous communication with an output of the resonance chamber 16, such as through piping 40. This piping 40 connecting the resonance chamber 16 and output non-thermal plasma reactor 18 is preferably electrically insulated piping, such as PVC pipe, in order to maintain the ionization of the effluent gas established within resonance chamber 16.

The output non-thermal plasma reactor 18 is electrically coupled to an AC or DC pulsed electrical power source for generation of a non-thermal plasma. A non-thermal plasma may be generated by a number of methods, including electrical fields, electron beams, and irradiation with electromagnetic energy of appropriate intensity and wavelength. Within the output non-thermal plasma reactor 18, dissociation of oxide contaminants occurs.

Suitable designs for the output non-thermal plasma reactor 18 include the glow discharge reactor, the RF (radio frequency) discharge reactor, the pulsed corona reactor, the dielectric-barrier discharge reactor, the electrified packed bed reactor, and the surface discharge reactor. These non-thermal plasma reactors are described in U.S. Pat. No. 5,746,984 to Hoard issued May 5, 1998, the entirety of which is incorporated herein by reference.

The power source of the output non-thermal plasma reactor 18 is preferably capable of generating AC and DC voltages in the range of 10,000 to 100,000 volts at 65 to 900 milliamperes and AC currents having frequencies between 60 to 20,000 Hertz. The voltage and frequencies will vary depending upon the quantities and chemical makeup of the effluent gases to be treated. For example, the output non-thermal plasma reactor 18 may be configured to target $SO_x$ and $NO_x$ contaminants. Heavy metals, hydrocarbons, and VOCs may be filtered from the effluent gas through resonance chamber 16, a collecting column (described below), and/or input non-thermal plasma reactor (described below). The power source requirements may be selected using standard formulas and assumptions used by manufacturers and designers of non-thermal plasma reactors. The power and frequency requirements and residence time requirements—the amount of time required within the reactor for treatment of the effluent gas—depend upon the quantity (or density) of the contaminants in the effluent gas to be treated. Manufacturers generally assume one Watt of power is needed for each part per million of contaminants, such as $NO_x$, $SO_x$, CO, and $CO_2$, in the effluent gas and provide multiplication constants for calculating the necessary voltages and frequencies for treating the effluent gases.

The output non-thermal plasma reactor 18 included within the pollution control device of the present invention also preferably include a frustum that funnels the effluent gas to the plasma field generated by the output non-thermal plasma reactor 18.

The pollution control device of the present invention includes an output cooling unit 20 in gaseous communication with an output of the output non-thermal plasma reactor 18. The cooling unit 20 may utilize a refrigerant such as ammonia (R-717), carbon dioxide (R-744), propane (R-290), ethane (R-170), methane (R-50), ethylene (R-1150), propylene (R-1270), glycol, or liquid nitrogen. The output cooling unit 20 cools the effluent gas to a non-excited state prior to either releasing the processed effluent gas into the environment through output 40a or re-injecting the effluent gas through piping 40b into the source 12, such as an engine, boiler, incinerator, or other effluent gas source. By cooling the effluent gas at this output stage, re-association of oxides in the effluent gas is substantially prevented by reducing the radical nature of the dissociated components. The stabilized state of the effluent gas, it is believed, allows the components to associate as near perfect elements, such as $N_2$ and $O_2$, rather than re-associating into harmful pollutants like NO, $NO_2$, $SO_2$ and $CO_2$.

The temperature to which the cooling unit 20 should cool the effluent gas will vary depending upon such factors as the components within the effluent gas and the ambient temperature of the release environment. It is believed that approximately 30° below ambient is sufficient to insure a non-excited steady state when releasing the effluent gas into the environment. It is believed, however, that it is not generally necessary to cool the mass to a temperature below 34° F.

If the output cooling unit 20 utilizes $CO_2$ as its refrigerant, some or all of the necessary $CO_2$ may be retrieved from the effluent gas stream. Carbon dioxide may be retrieved from the pollution control device, preferably after the effluent gas has been filtered, by, for example, the collection chamber 22 (described below), or input non-thermal plasma reactor 14 (described below), or output non-thermal plasma reactor 18. Separation of the $CO_2$ from the effluent gas may be achieved by pulling the effluent gas through an ultra fine membrane via a peristaltic pump. The $CO_2$ may then be compressed to approximately 900 to 1000 psi and cooled to atmospheric temperature. The $CO_2$, now in liquid form, is passed through an expansion valve and compressed to approximately 5.3 times atmospheric pressure. The $CO_2$ may then be used as a refrigerant in a cooling unit 20. Alternatively, the captured $CO_2$ may be resold, such as for commercial or industrial uses. This feature may be particularly advantageous when a device or devices according to the present invention are used in large scale industrial processes.

Figure 2:
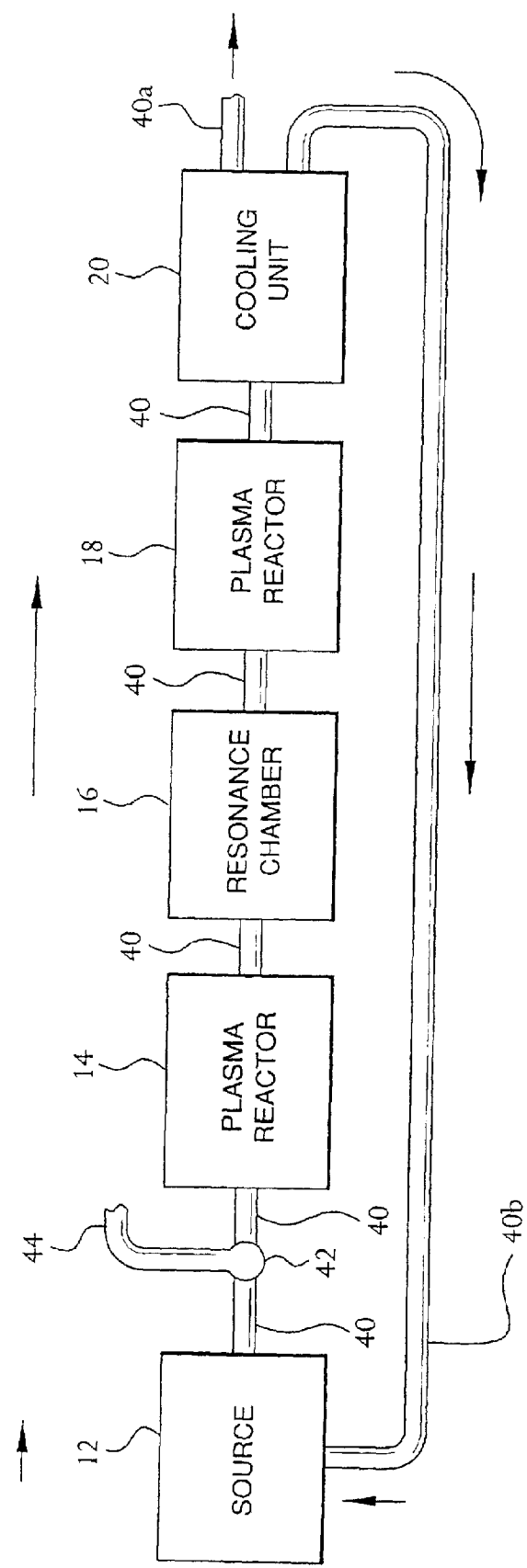
FIG. 2 is a block diagram of an exemplary embodiment of a pollution control device according to the present invention including an input non-thermal plasma reactor.

Referring to FIG. 2, a pollution control device according to the present invention may include an input non-thermal plasma reactor 14. The input non-thermal plasma reactor 14 is preferably included within a pollution control device of the present invention when the source 12 of the effluent gas includes high concentrations of uncombusted hydrocarbons, VOCs or heavy metals. The input non-thermal plasma reactor 14 serves as an afterburner, but may also serve to ionize components of the effluent gas. The input non-thermal plasma reactor 14 may include a non-thermal plasma reactor of a type discussed above for the output non-thermal plasma reactor 18. In order to process the heavy metals and uncombusted hydrocarbons, the power and/or frequency of the power source coupled to the input non-thermal plasma reactor 14 is generally higher than that for an output non-thermal plasma reactor 18 configured to process $NO_x$ and $SO_x$ contaminants. Alternatively, the input and output non-thermal reactors may both be configured to target like contaminants, such as $NO_x$ and $SO_x$.

Figure 3:
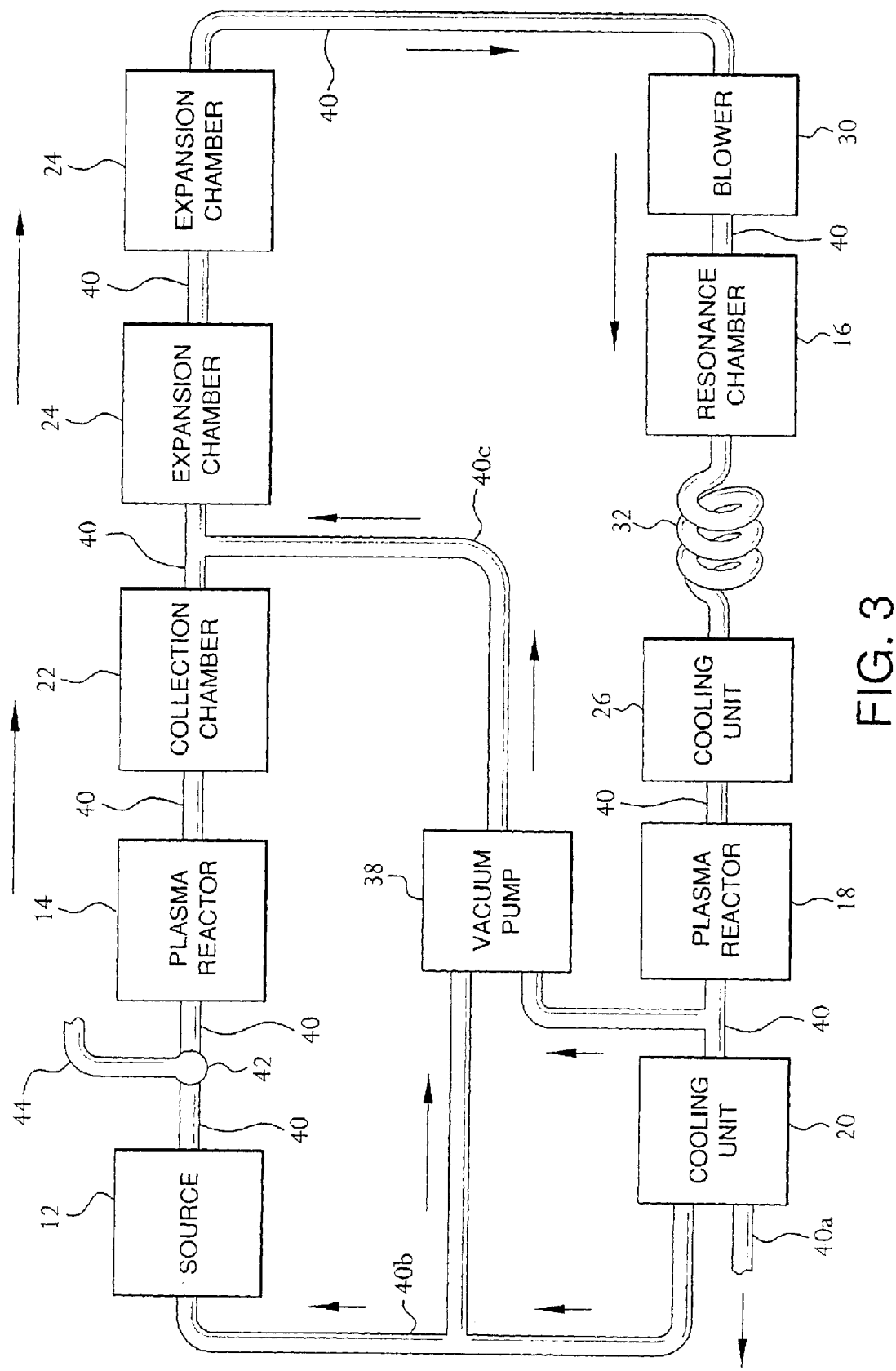
FIG. 3 is a block diagram of another embodiment of an exemplary pollution control device according to the present invention.

Other exemplary embodiments of the present invention may include further components which help condition the effluent gas and reduce contaminants in the effluent gas before the effluent gas enters output non-thermal plasma reactor 18. Referring to FIG. 3, a pollution control device may further include a collection chamber 22 disposed between the source 12 of the effluent gas and an input of the resonance chamber 16. The collection chamber 22 may be a collecting column preferably fabricated from aluminum and including aluminum media, such as an aluminum mesh. The aluminum collecting column facilitates a contact collection of hydrocarbons and heavy oxide compounds, such as hydrogen-based oxides. The aluminum of the collecting column may also have some catalytic value, depending upon the components of the effluent gas, and produce reducing agents, such as Ammonia ($NH_3$), for oxides.

The collection chamber 22 is preferably shaped to promote a cyclonic turbulent air flow in order to promote surface reaction with the effluent gas. The chamber is preferably engineered in such a fashion that when the effluent gas enters the collecting chamber, it is led through the chamber's interior so that the laminar flow becomes turbulent. For example, turbulent flow may be promoted in a cylindric collecting column having an output at a top end of a column by disposing the input to the column towards a bottom end of the column and along the side of the column. The aluminum collecting column may also serve as a heat exchanger, thereby reducing the temperature of the effluent gas.

A pollution control device may also include an expansion chamber 24 or series of expansion chambers 24 (such as shown in FIG. 3) disposed between the source 12 of the effluent gas and resonance chamber 16. The expansion chambers 24 are designed to gradually decrease the temperature, pressure and velocity of the effluent gas as it flows through the pollution control device. The expansion chambers 24 may include baffle plates with drilled holes for allowing the effluent gas to flow through the baffle. Expansion chambers of this type are described in Taylor et al. The baffles reduce the flow of the effluent gas and may be made adjustable in order to further control the flow of the effluent gas. The pollution control device preferably operates at ½ pound over atmosphere, and the adjustable baffles may be controlled by a PLC to maintain a desired resistance. The reduction in temperature of the effluent gas accomplished by the expansion chambers helps to stabilize the effluent gas before reaching the output non-thermal plasma reactor 18 and/or the effluent gas exiting input non-thermal plasma reactor 14.

Exemplary baffles may be formed from stainless steel and/or may be lined with a non-magnetic material such as aluminum to collect hydrocarbons and provide catalytic value to the expansion chambers 24. Catalytic reactions, such as those in the expansion chambers 24 serve to reduce the contaminants for processing by the output non-thermal plasma reactor 18. By removing these contaminants, the output non-thermal plasma reactor may be configured to target the $NO_x$ and $SO_x$ components of the effluent gas. Further, although the kinetic models are not known for the reaction, test results have shown elevated levels of $O_2$ as a percentage of the effluent gas volume. The $O_2$ and any $O_3$ (ozone) present in the effluent stream may then be may be re-injected into the process stream, such as into the source (e.g., a combustion source), before the input non-thermal plasma reactor 14, or before the expansion chambers 24.

The device may also include a blower means 30 for controlling the gaseous flow of the effluent gas through the pollution control device. The blower means 30 may be, for example, an enclosed variable speed fan assembly or a damper, or other means for regulating gaseous flow. The blower preferably controls the flow of the effluent gas such that the pollution control device operates at approximately ½ pound over atmosphere. The pollution control device may, however, operate at atmospheric conditions. Alternatively, a blower means 30 is not needed if the flow of the effluent gas is sufficient to drive the effluent gas through the pollution control device.

The flow of the effluent gas may also be regulated by the blower means 30 relative to measured contaminant levels. If the contamination rates are high, the dwell time of the effluent gas within the pollution control device may be increased, and conversely, if the contamination rates are low, the flow velocity of the effluent gas may be increased, thereby reducing the necessary dwell time of the effluent gas. More preferably, this feature may be utilized to control the residence time of the effluent gas in the non-thermal plasma reactors of the pollution control device. The blower is preferably controlled by logic circuitry responsive to the measured contamination levels.

The blower means 30 may also be used to insure that the effluent gas does not reach any dew points before reaching the output cooling unit 20 or input cooling unit 26 (described below) as the effluent gas naturally cools as it passes through the pollution control device (e.g., within the expansion chambers 24, piping 40, or collection column 14). If the effluent gas prematurely reaches dew points while passing through the pollution control device, unwanted clogging of the components and piping 40 of the apparatus may occur.

In another exemplary embodiment of the present invention, the pollution control device includes an input cooling unit 26 disposed between an output of the resonance chamber 16 and an input of the output non-thermal plasma reactor 18. The resonance chamber 16 and input cooling unit 26 are preferably in gaseous communication through piping 32. Piping 32 is preferably electrically insulating piping, such as PVC pipe, that help to maintain the ionization produced in resonance chamber 16. The piping 32 may also be coiled to further reduce the velocity of the effluent gas flow and reduce the temperature of the effluent gas.

When the pollution control device includes an input cooling unit 26, the output non-thermal plasma reactor 18 should be configured to operate at the temperature of the cooled effluent gas leaving the input cooling unit 26. The desired temperature will depend upon the components of the effluent gas and their dew points, but the temperature of the effluent gas leaving the input cooling unit 26 generally should be between approximately 40° F.–52° F., a temperature sufficient to induce desirable dew points and move the effluent gas towards a non-excited and non-reactive state before entering the output non-thermal reactor 18. The cooled effluent mass is thereby placed in a calm, steady state when the plasma streamers from the output non-thermal plasma reactor 18 crack any remaining oxides. The effluent gas exiting the output non-thermal reactor 18, which may have increased in temperature within the output non-thermal reactor 18, is then cooled by the output cooling unit 20 to insure a non-excited mass. Re-association of the components of the non-excited mass into harmful pollutants is thereby greatly reduced and prevented when the mass is re-injected into source 12 or released into the environment. Further, after exiting the output non-thermal plasma reactor 18, additional solids, may be pulled down in condensate if dew points are reached within output cooling unit 20.

As mentioned, several dew points for components of the effluent gas may be reached within the input cooling unit 26 or output cooling unit 20. When a dew point is reached, condensates form of water and solids including nitrate, nitrite, sulfate, and sulfite compounds. Once the water is removed from these condensates, the nitrate and nitrite compounds may be removed. These compounds may be offered for resale as fertilizer. Also, the sulfate and sulfite compounds may be removed and offered for resale for use in numerous chemical processes.

Also as mentioned above, a slip stream of the effluent gas that includes $O_2$ and $O_3$ may be removed from the effluent gas and re-injected into the effluent stream, such as by a vacuum pump 38. The vacuum pump 38 may be disposed to remove the slip stream from an output of the second non-thermal plasma reactor 18 or an output of output cooling unit 20 and funnel the stream to an input of the expansion chambers 24 through piping 40c. This embodiment of the present invention provides at least two beneficial features. First, the slip stream is at a temperature that is lower than that of the effluent gas entering the expansion chambers 24. Thus, the stream helps cool the effluent gas and begin the gradual process of placing the effluent gas in a non-excited state. Second, it is known that ozone is a powerful oxidizer that helps to reduce pollutants in an effluent gas.

Figure 4A:
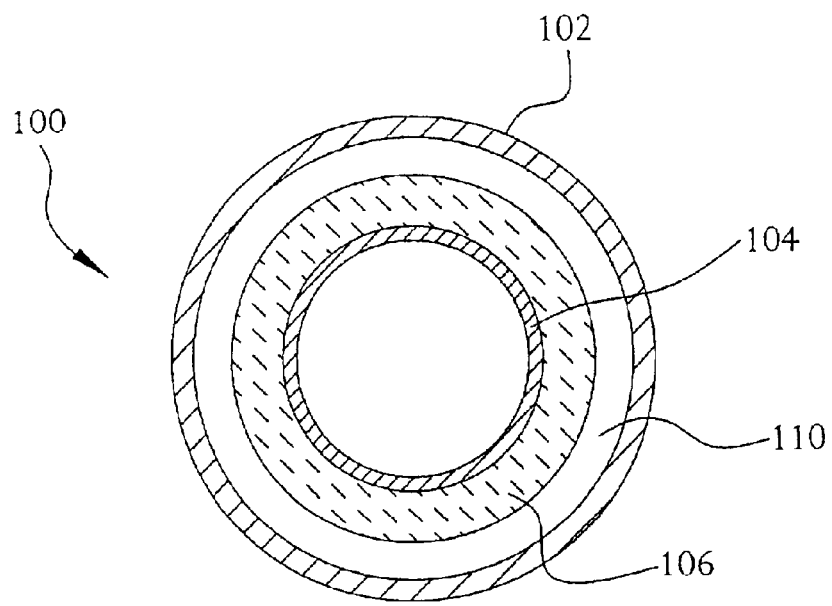
FIG. 4A is a cross-sectional view of an exemplary non-thermal plasma reactor according to the present invention.
Figure 4B:
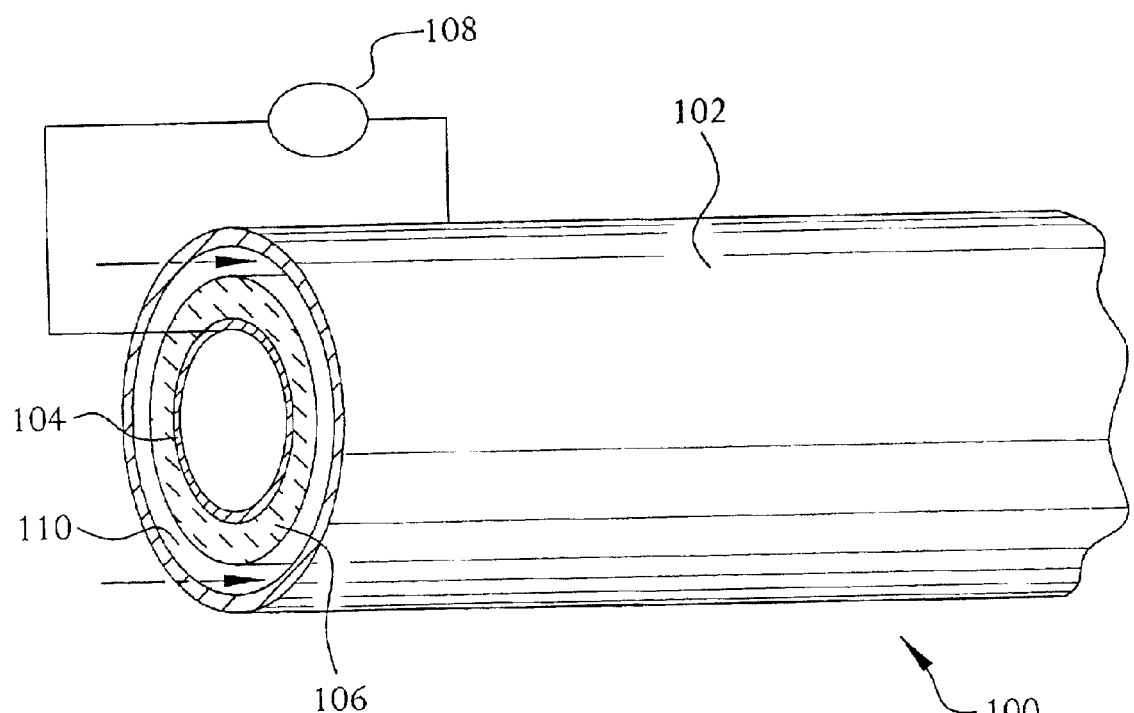
FIG. 4B is a partial perspective view of the exemplary non-thermal plasma reactor of FIG. 4A.

FIGS. 4A and 4B illustrate an exemplary non-thermal plasma reactor 100 that may be used as the output non-thermal plasma reactor 18 and/or input non-thermal plasma reactor 14 of the present invention. The reactor 100 includes a cylindrical outer conductive shell 102 preferably formed from non-corrosive 304 stainless steel polished to a 32 micron finish or better. An inner conductive core, such as inner conductive shell 104, a corona wire, or wire mesh, is centered within the diameter of the outer conductive shell 102 and extends axially through the outer conductive shell 102. A dielectric barrier 106 surrounds the inner conductive shell 104. The outer conductive shell 102 is preferably grounded.

The dielectric barrier 106 is preferably a glass tube, such as formed from fused silica or bora silica, with the inner conductive shell 104 coated on an inside surface of the dielectric barrier 106. The inner conductive shell may be formed from a nickel-silver coating, such as Dupont #7713, and baked onto the interior surface of the glass tube.

A power source 108 is electrically coupled between the inner conductive shell 104 and outer conductive shell 102, such as by soldering leads to the shells 104, 102. The power supply may be an AC or DC power supply with voltage and/or frequency selected in a conventional manner, as described above, for non-thermal plasma reactor designs that target selected contaminants and quantities of contaminants. Generally, the voltage value will vary between 10,000 and 100,000 volts at 165 to 900 milliamperes, and the frequency may vary between 60 and 25,000 Hz.

An open space 110 is formed between outer conductive shell 102 and dielectric barrier 106. The space 110 continues through the length of the plasma reactor 100. A plasma field is generated within the open space 110 formed between the dielectric barrier 106 and the outer conductive shell 102 when the power supply 108 is coupled to the plasma reactor 100. An effluent gas containing contaminants is passed through the field in the open space 110 between the dielectric barrier 106 and outer conductive shell 102 as shown by the arrows of FIG. 4B. The dielectric barrier 106 effectively protects the inner conductive shell 104 from the contaminants of the effluent gas, thereby preventing the build-up of unwanted contaminants on the inner conductor 104. These build-ups impede the operation of prior art non-thermal plasma reactors, reduce their efficiency, and give rise to the need to replace the inner conductors, such as corona wires, of the these prior art non-thermal plasma reactors.

The following examples of the pollution control device and method of the present invention demonstrate the invention with respect to a particular application and in no way limit the inventions disclosed herein.

In the test examples, a small scale pollution control device according to the present invention was coupled to a source of an effluent gas. The pollution control device included an input non-thermal plasma reactor powered by a 30,000 V, 120 mA power source at 60 Hz. An aluminum collecting column was coupled to an output of the input non-thermal plasma reactor, and an output of the collecting column was coupled to a series of two aluminum lined expansion chambers. A blower was included to control the flow of the effluent gas, and a resonance chamber was powered by a 25,000 V, 240 mA power source at 100 Hz. A PVC coil connected the resonance chamber to an input cooling unit operated at 45° F. An output non-thermal plasma reactor was coupled to an output of the input cooling unit and powered by a 4.5 kHz, 20,000V power supply at 260 mA. An output cooling unit was coupled to an output of the output non-thermal plasma reactor and operated at 34° F. The temperature of the exhaust measured in an output stack after the effluent gas exited the pollution control device ranged from approximately 50° to 54° F. The input and output non-thermal plasma reactors were of a design described above and shown in FIGS. 4A and 4B.

Oxygen and carbon dioxide changes are expressed as changes in their levels as percentages of the effluent gas volume. When available, percentage changes in other components were expressed relative to the measured change in amount of the component measured in pounds per hour (lb/hr). Otherwise, percentage changes were expressed in the change in measured component in parts per million in the volume (ppmV).

EXAMPLE I

In the first example, a test was conducted by an independent lab that performs emission certification testing in accordance with EPA methods. Factor variables, such as moisture and cubic feet per minute (CFM), were accounted for in the results. The exhaust of a propane-fired fork lift was coupled to the pollution control device described above.

The results indicated that $O_2$ as a percentage of the total effluent emission stream increased after the process, $CO_2$ as a percentage of the total effluent emission stream decreased by 63% from 9.92% to 3.69%, CO levels decreased 83% from 0.64 lb/hr to 0.11 lb/hr, $SO_2$ levels decreased 83% from $4.3 \times 10^{-4}$ lb/hr to $7.2 \times 10^{-5}$ lb/hr, and $NO_x$ levels decreased 98% from 0.1 lb/hr to 0.002 lb/hr.

EXAMPLE II

In a second example, a test was conducted by an independent lab that performs emission certification testing in accordance with EPA methods. The exhaust of a 40 horse power diesel generator was coupled to the pollution control device described above.

The results indicated a reduction in flow rate from 241 ACFM (actual cubic feet per minute) to 155 ACFM, $O_2$ as a percentage of the total effluent emission stream increased after the process, a reduced $CO_2$ percentage level from 2.15% to 1.04% of the effluent volume, a reduced CO level from 286 ppmV to 156 ppmV and 0.29 lb/hr to 0.10 lb/hr (65.5%), and a reduced $NO_x$ levels from 238 ppmV to 78 ppmV and 0.40 lb/hr to 0.09 lb/hr (77.5%). $SO_x$ levels changes were negligible due to the trace amounts of sulfur in the diesel fuel.

EXAMPLE III

In a third example, the exhaust of a forty horse power diesel generator was coupled to the pollution control device described above. A test was performed in house using standard testing techniques. The aforementioned blower included a variable speed fan and was used to insure the CFM velocity of the effluent gas through the pollution control device equaled the base-line CFM of the untreated emissions.

The results indicated slight increases in $O_2$ percentage levels, a 50% decrease in $CO_2$ percentage levels from 2% to 1% of the effluent volume, a 64% decrease in CO levels from 278 ppmV to 100 ppmV, a 28% decrease in $SO_2$ levels from 464 ppmV to 332 ppmV, a 72% decrease in NO levels from 170 ppmV to 48 ppmV, and an 86% decrease in $NO_x$ levels from 150 ppmV to 20 ppmV.

EXAMPLE IV

In a fourth example, a test was conducted by an independent lab that performs emission certification testing in accordance with EPA methods. The exhaust of a coal-fired incinerator was coupled to the pollution control device described above. The aforementioned blower included a variable speed fan and was used to insure the CFM velocity of the effluent gas through the pollution control device equaled the base-line CFM of the untreated emissions.

The $NO_x$ and $SO_x$ levels were monitored. The results indicated reductions in $SO_2$ levels from 205 ppmV to 51 ppmV and 0.19 lb/hr to 0.06 lb/hr (68.4%), and reduced $NO_x$ levels from 68 ppmV to 31 ppmV and 0.05 lb/hr to 0.02 lb/hr (60.0%).

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A pollution control device for reducing contaminants in an effluent gas, comprising:
   a resonance chamber, said resonance chamber in gaseous communication with a source of said effluent gas, said resonance chamber configured to ionize said effluent gas;
   an output non-thermal plasma reactor, said output non-thermal plasma reactor in gaseous communication with an output of said resonance chamber, said output non-thermal plasma reactor configured to dissociate at least a portion of said contaminants in said effluent gas; and
   an output cooling unit in gaseous communication with an output of said output non-thermal plasma reactor, said output cooling unit adapted to cool said effluent gas to a non-excited state, wherein re-association of radical oxides in said effluent gas is substantially reduced.

2. The pollution control device of claim 1, further comprising an input non-thermal plasma reactor disposed between said source of said effluent gas and said resonance chamber, said input non-thermal plasma reactor configured to dissociate at least a portion of said contaminants in said effluent gas.

3. The pollution control device of claim 2, wherein said input non-thermal plasma reactor is a glow discharge reactor, a radio frequency discharge reactor, a pulsed corona reactor, a dielectric-barrier discharge reactor, an electrified packed bed reactor, or a surface discharge reactor.

4. The pollution control device of claim 2, wherein said input non-thermal plasma reactor comprises:
   a cylindrical outer conductive shell;
   an inner conductive core centered within the diameter of said outer shell and extending axially through said outer shell;
   a dielectric barrier surrounding said inner core and spaced from said outer shell; and
   a power source electrically coupled between said inner core and outer conductive shell,
   wherein said effluent gas flows between said dielectric barrier and said outer conductive shell and said effluent gas is exposed to a non-thermal plasma field generated between said inner core and said outer shell.

5. The pollution control device of claim 1, further comprising a collection chamber disposed between said source of said effluent gas and an input of said resonance chamber, said collection chamber configured to perform contact collection of contaminants from said effluent gas.

6. The pollution control device of claim 1, further comprising at least one expansion chamber, disposed between said source of said effluent gas and said output non-thermal plasma reactor, for decreasing the temperature, pressure, and velocity of said effluent gas.

7. The pollution control device of claim 6, wherein said expansion chamber further comprises a catalytic lining for collecting and reacting with hydrogen based oxides from said effluent gas.

8. The pollution control device of claim 6, wherein said expansion chamber is disposed between said source of said effluent gas and an input of said resonance chamber and at least a portion of said effluent gas is coupled to an input of said expansion chamber after exiting said output not-thermal plasma chamber.

9. The pollution control device of claim 1, further comprising an electrically insulating pipe connected to an output of said resonance chamber, said electrically insulating pipe substantially configured to maintain the ionization of said effluent gas exiting said resonance chamber.

10. The pollution control device of claim 9, wherein said electrically insulating pipe is a coiled PVC pipe.

11. The pollution control device of claim 1, wherein said output non-thermal plasma reactor is a glow discharge reactor, a radio frequency discharge reactor, a pulsed corona reactor, a dielectric-barrier discharge reactor, an electrified packed bed reactor, or a surface discharge reactor.

12. The pollution control device of claim 1, wherein an output of said output cooling unit is in gaseous communication with said source of said effluent gas.

13. The pollution control device of claim 1, further comprising an input cooling unit disposed between an output of said resonance chamber and an input of said output non-thermal plasma reactor, said input cooling unit adapted to cool said effluent gas to stabilize said effluent gas before said effluent gas enters said output non-thermal plasma reactor.

14. The pollution control device of claim 1, wherein said output non-thermal plasma comprises:
a cylindrical outer conductive shell;
an inner conductive core centered within the diameter of said outer shell and extending axially through said outer shell;
a dielectric barrier surrounding said inner core and spaced from said outer shell; and
a power source electrically coupled between said inner core and outer conductive shell,
wherein said effluent gas flows between said dielectric barrier and said outer conductive shell and said effluent gas is exposed to a non-thermal plasma field generated between said inner core and said outer shell.

15. The pollution control device of claim 1, further comprising a blower means for controlling the gaseous flow of said effluent gas through said pollution control device.

16. The pollution control device of claim 1, wherein said cooling unit uses a refrigerant selected from the group consisting of ammonia, carbon dioxide, propane, ethane, methane, ethylene, propylene, glycol, or liquid nitrogen.

17. The pollution control device of claim 1, wherein said cooling unit uses carbon dioxide as a refrigerant and at least a portion of said carbon dioxide is extracted from said effluent gas, said pollution control device further comprising a means for removing said portion of said carbon dioxide from said effluent gas.

18. A pollution control device for reducing contaminants in an effluent gas, comprising:
at least one expansion chamber in gaseous communication with a source of said effluent gas, said expansion chamber configured to reduce the temperature, velocity and pressure of said effluent gas;
a resonance chamber in gaseous communication with an output of said expansion chamber, said resonance chamber configured to ionize said effluent gas;
an input cooling unit in gaseous communication with an output of said resonance chamber;
an output non-thermal plasma reactor in gaseous communication with an output of said input cooling unit, said output non-thermal plasma reactor dissociating at least a portion of said contaminants, said input cooling unit adapted to cool said effluent gas to stabilize said effluent gas before said effluent gas enters said output non-thermal plasma chamber; and
an output cooling unit in gaseous communication with an output of said output non-thermal plasma reactor, said output cooling unit adapted to cool said effluent gas to a non-excited state, wherein re-association of oxides in said effluent gas is substantially reduced.

19. The pollution control device of claim 18, wherein said expansion chamber further comprises a catalytic lining for collecting and reacting with hydrogen based oxides from said effluent gas.

20. The pollution control device of claim 18, wherein an at least a portion of said effluent gas is coupled to an input of said expansion chambers after exiting said output non-thermal plasma reactor.

21. The pollution control device of claim 18, further comprising an input non-thermal plasma reactor disposed between said source of said effluent gas and an input of said resonance chamber, said input non-thermal plasma reactor configured to dissociate a portion of said contaminants in said effluent gas.

22. The pollution control device of claim 18, further comprising a collection chamber disposed between said source of said effluent gas and an input of said resonance chamber, said collection chamber configured to perform contact collection of contaminants from said effluent gas.

23. The pollution control device of claim 18, further comprising:
an input non-thermal plasma reactor disposed between said source of said effluent gas and an input of said expansion chamber, said input non-thermal plasma reactor configured to dissociate at least a portion of said contaminants in said effluent gas; and
a collection chamber disposed between an output of said input non-thermal plasma reactor and an input of said expansion chamber, said collection chamber configured to perform contact collection of contaminants from said effluent gas.

24. The pollution control device of claim 18, further comprising an electrically insulating pipe connecting said resonance chamber to said input cooling unit, said electrically insulating pipe substantially configured to maintain the ionization of said effluent gas exiting said resonance chamber.

25. The pollution control device of claim 24, wherein said electrical insulating pipe is a coiled PVC pipe.

26. The pollution control device of claim 18, wherein said output non-thermal plasma reactor is a glow discharge reactor, a radio frequency discharge reactor, a pulsed corona reactor, a dielectric-barrier discharge reactor, an electrified packed bed reactor, or a surface discharge reactor.

27. The pollution control device of claim 18, wherein said output non-thermal plasma reactor comprises:

a cylindrical outer conductive shell;

an inner conductive core centered within the diameter of said outer shell and extending axially through said outer conductive shell;

a dielectric barrier surrounding said inner core and spaced from said outer conductive shell; and a power source electrically coupled between said inner core and outer conductive shell, wherein said effluent gas flows between said dielectric barrier and said conductive shell and said effluent gas is exposed to a non-thermal plasma field generated between said inner core and said outer core.

28. The pollution control device of claim 18, wherein an output of said output cooling unit is in gaseous communication with said source of said effluent gas.

* * * * *